INVENTORS
PARK H. MILLER, JR.
DWIGHT C. POUND
HERSCHEL R. SNODGRASS

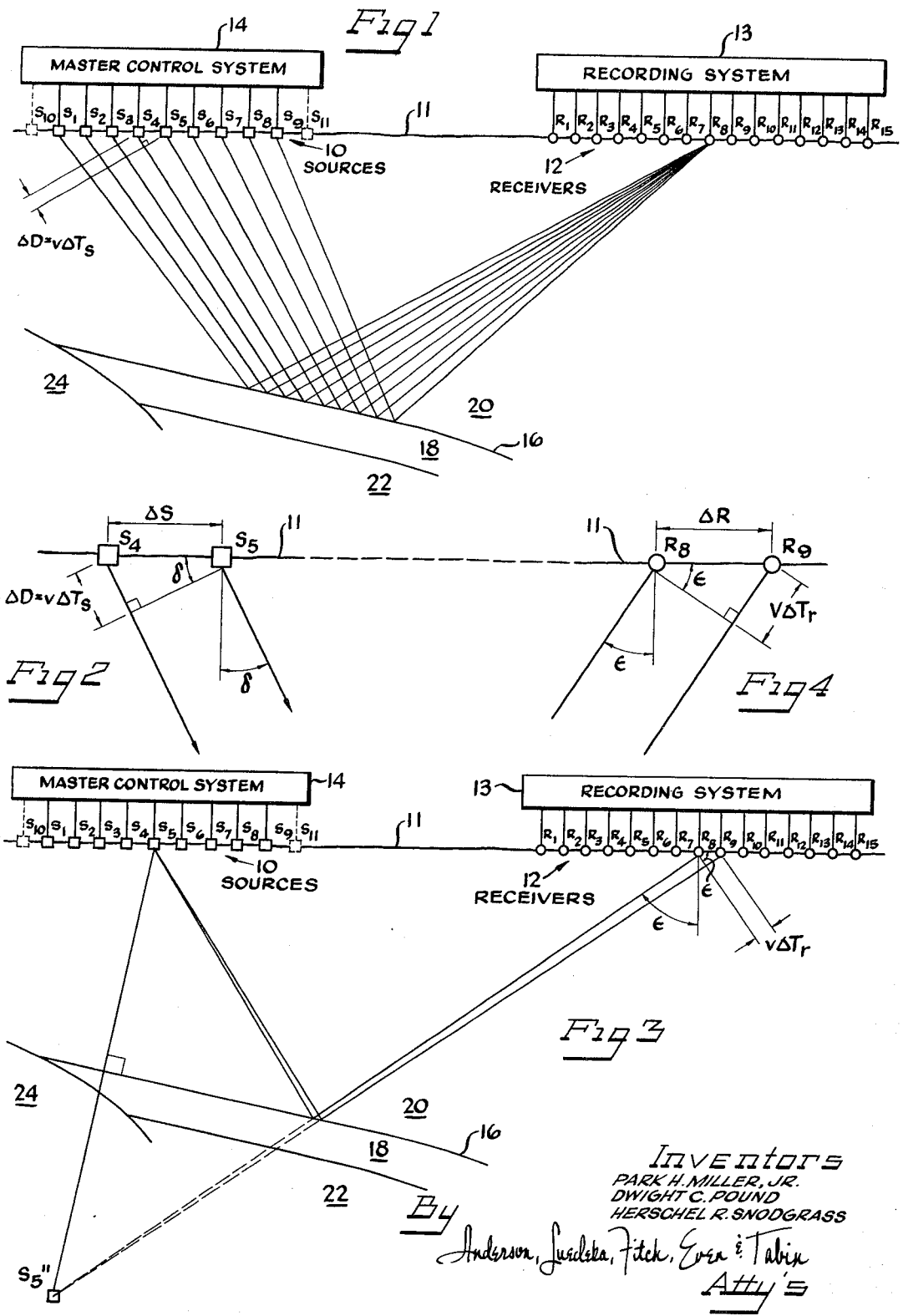

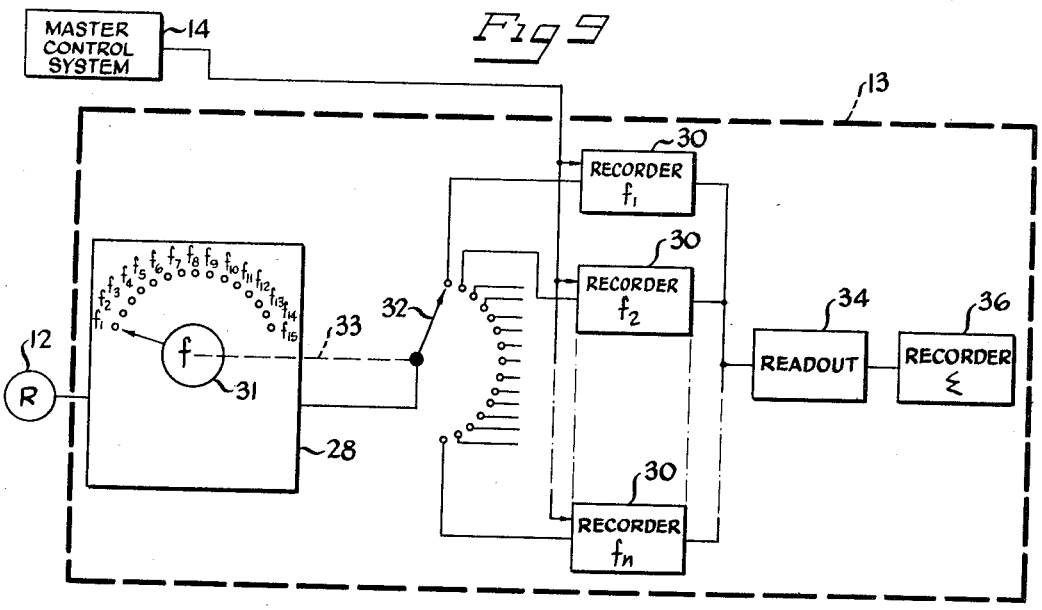
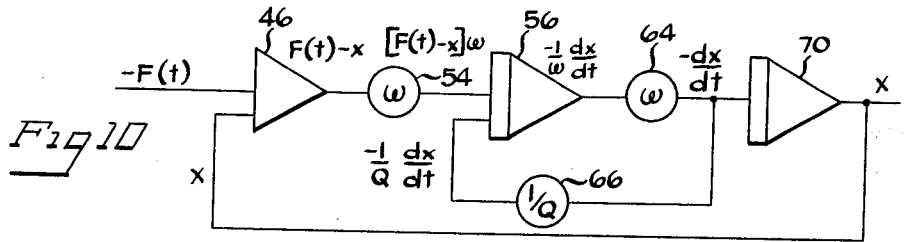
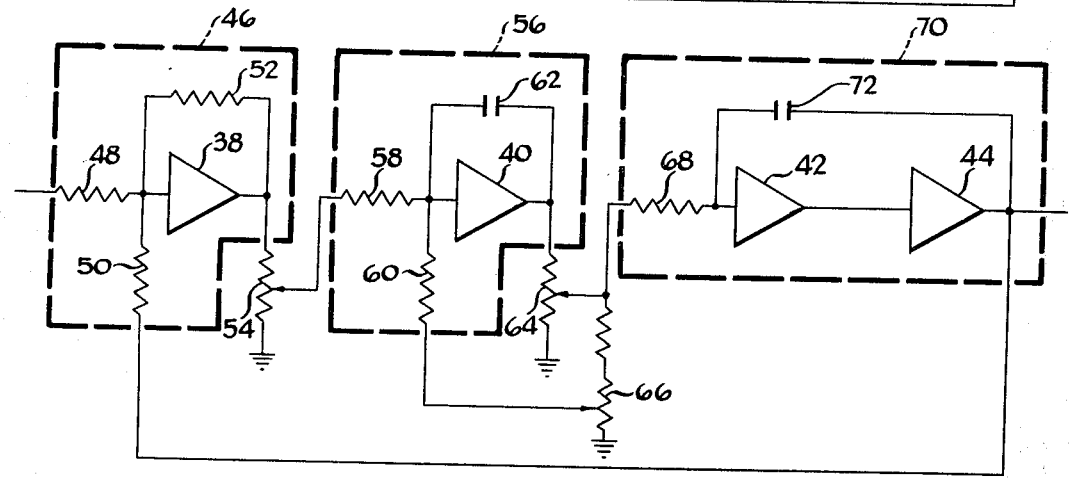

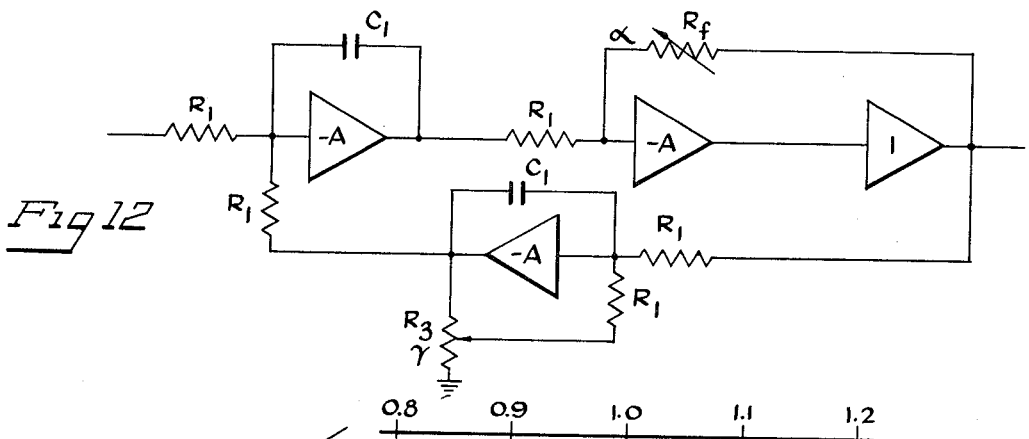
Fig 12
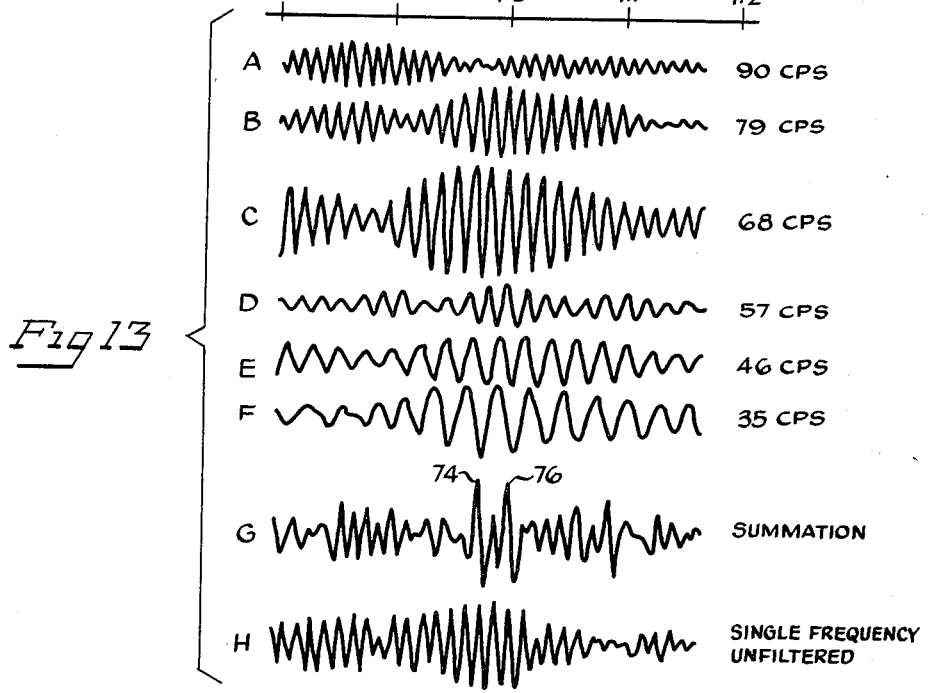
Fig 13
Fig 14
Inventors
PARK H. MILLER, JR.
DWIGHT C. POUND
HERSCHEL R. SNODGRASS

United States Patent Office 3,363,229
Patented Jan. 9, 1968

3,363,229
GEOPHYSICAL PROSPECTING BY COMPARING THE TIMES OF APPLICATION WITH THE TIME OF OCCURRENCE OF THE COMBINED RECEIVED SEISMIC SIGNALS
Park H. Miller, Jr., Del Mar, Dwight C. Pound, Solana Beach, and Herschel R. Snodgrass, San Diego, Calif., assignors to General Dynamics Corporation, New York, N.Y., a corporation of Delaware
Filed July 13, 1964, Ser. No. 382,086
13 Claims. (Cl. 340—15.5)

This invention relates generally to the art of seismic prospecting, particularly to seismic prospecting utilizing a plurality of seismic sources relatively phased to provide a directed beam of seismic energy at each of a plurality of frequencies, and more particularly to seismic prospecting utilizing a plurality of frequencies, with the energy emitted in pulses or short wave trains at each frequency, and having the detected signals at the various frequencies combined to produce a time compressed signature.

Seismic prospecting involves the determination of the relative location of structures in the earth. Seismic prospecting is the technique wherein reflected or refracted sound waves are utilized to measure the location of boundaries between various strata. In conventional seismic prospecting, a charge of dynamite is exploded near the surface of the earth and the time is measured for the resultant seismic wave to travel to a particular subsurface stratum and be reflected to a detector on the surface. The detector used is commonly called a geophone. Knowing or determining the velocity of the waves through the earth, one can then determine from the measured travel time the depth at which the wave was reflected, and hence the depth of the reflecting stratum. Ordinarily, there are many reflecting strata, and therefore, the geophone detects a number of reflected waves. Thus the depth of a number of strata can be determined from a single explosion.

Although dynamite sources are widely used quite successively, they have a number of limitations. For one thing, they are destructive of the earth where they are shot, thus making it impossible to duplicate the shots. They are omnidirectional, hence expending energy wastefully in useless directions. Further, waves transmitted in more than one direction can be reflected to the same geophone, and may even arrive at the same time, thus making it difficult to determine the direction and depth of the reflecting stratum. Further, the sharpness of the detected waves is limited by the natural frequencies that are created by the explosion.

Seismic waves can also be produced by dropping large weights. Weight dropping has most of the disadvantages of the explosive sources being generally omnidirectional, destructive of the earth and generating frequencies limited by the natural frequencies of the earth.

Another type of source consists of a circular plate maintained in forced contact with the surface of the earth by means of the massive weight of a truck under which the plate is mounted. The plate is then driven or caused to vibrate at a continuously varying frequency. This source is not destructive of the earth.

In the present invention, it is preferred to use a number of seismic sources each similar to that described in the copending application of Park H. Miller, Jr., Ser. No. 204,739, filed June 25, 1962, now Patent No. 3,282,371, entitled "Method of and Apparatus for Generating Seismic Waves" or in the copending application of Park H. Miller, Jr., Dwight C. Pound and Herschel R. Snodgrass Ser. No. 382,304 filed July 13, 1964, entitled "Method of and Apparatus for Generating Seismic Waves." In the present invention, a plurality of such sources are arranged in a particular geometrical configuration, preferably equally spaced in a straight line, and are preferably synchronized to operate at a particular relative phase to produce a directed beam of waves at each of a plurality of frequencies.

Each source is preferably a rigid annular plate held in contact with the surface of the earth by means of an anchor beneath the plate. The anchor is connected to the plate by a tension member. The tension in the member is caused to vary sinusoidally to create a sinusoidally varying force on the surface of the earth. This force moves the surface of the earth creating compressional waves, i.e., seismic waves, which are radiated into the earth.

In the present system, the various sources are preferably driven under the control of a control system which applies a train of pulses to the various seismic sources, the application of each train being made to the respective sources at different times. Thus, the various sources are caused to produce substantially identical seismic wave trains at different relative phases. This results in an overall seismic wave pattern having directivity.

The sources apply seismic waves to the earth at each of a respective one of a plurality of spaced points. These waves are reflected at various reflecting strata and detected at a receiving station. The reflections of the waves from all sources are detected at the same time, producing a signal representative of the combination of all reflected waves. To emphasize a particular stratum, the combined waves are maximized for a particular reflection by varying the relative phase of the waves applied by respective sources. The relative phase for such maximizing may then be measured as an indication of the direction of the combined acoustic waves and hence of the apparent dip of the selected stratum. The directivity thus performs two functions, emphasis of a selected stratum and measurement of its relative dip. Each function has separate utility.

The detectors or receivers may also be phase related to provide directivity. In the present invention, a plurality of geophones are used, preferably in an equally spaced linear array, and the signals from the respective geophones are relatively delayed by appropriate means to place the received signals substantially in coincidence. The delay required for such coincidence is indicative of the direction of the reflected signal.

The direction of the original beam, the direction of the reflected signal and the time between transmission and reception of the waves, given the distance between the source and receiver arrays, are determined by the average wave velocity and the depth and dip of the reflecting strata and are, therefore, indicative thereof. Thus, by measuring the relative phase difference between sources for maximized combined detected waves, the difference in time of arrival at the detectors of the maximized combined detected waves, and the transit time thereof, the wave velocity and the dip and depth of a selected stratum can be accurately determined.

An important feature of the present invention is the provision for time compression of the detected signals. This is achieved by driving the sources successively at a plurality of respective frequencies, the length of the wave trains at the respective frequencies being substantially equal. The detected wave trains for the successive frequencies are then summed to provide a resultant signal that includes in a short time span the information contained in all of the wave trains which were emitted over the longer period of time. More particularly, by utilizing appropriate narrow-band filters, selecting certain preferred frequencies and lengths of pulse trains, and appropriately adjusting the control system, the resultant measurement provides a large spike or "signature" indicative of each of the reflecting strata, with relatively little confusion with background noise or reflections from other strata outside the beam. This permits the resolution of deep reflecting strata within the ambient noise level.

It is, therefore, an object of the present invention to provide a system of seismic prospecting where the sources may direct seismic energy to particular reflecting strata. A further object of the invention is to provide a method of seismic prospecting where the waves are directed by the relative phasing of a plurality of sources. Still another object of the invention is to provide such a method of seismic prospecting where the relative phasing of the sources is varied to maximize the waves reflected from a selected reflecting stratum and received at a receiving station. A still further object is to provide such a method of seismic prospecting where the relative phasing of the sources for such maximizing, the relative time of arrival of the maximized signal at two receiving stations and the transit time of the waves from sources to receiving stations are measured to provide an indication of the wave velocity and the dip and depth of the selected stratum.

Another object of the invention is to provide a seismic system wherein the detection signal may be compressed by multiple frequency techniques. It is a further object of the invention to provide a system wherein the signals received from deep reflecting strata can be resolved within the ambient noise level. It is still another object of the invention to provide such a system wherein the measurements are reproducible, permitting repeat "shots" and ensuring high fidelity records. It is still another object of the invention to provide such a system wherein the frequency utilized can be controlled to suppress ground roll, to permit study of interference effects and to control the transmissivity and reflectivity of the strata to be detected.

Other objects and advantages of the present invention will become apparent by reference to the following description taken in conjunction with the accompanying drawings, in which:

FIGURE 1 is a simplified illustration, partly in section and partly diagrammatic, showing a preferred arrangement of seismic sources and detectors for one embodiment of the present invention and the paths of seismic waves for maximized detected reflected signals;

FIGURE 2 is an enlarged view of a part of FIGURE 1 showing successive sources and the delay of the seismic waves for maximized detected reflected signals;

FIGURE 3 shows the arrangement of sources and detectors shown in FIGURE 1 and the paths of the waves from a given source reflected to successive receivers;

FIGURE 4 is an enlarged view of a part of FIGURE 3 showing successive receivers and the delay of the waves to successive receivers;

FIGURE 9 is a diagrammatic illustration of the recorder system utilized for signal compression;

FIGURE 10 is a diagrammatic illustration of one embodiment of a filter useful in the system shown in FIGURE 9;

FIGURE 11 is a schematic illustration of the filter shown in FIGURE 10;

FIGURE 12 is a diagrammatic illustration of another embodiment of a filter useful in the system shown in FIGURE 9;

FIGURE 13 is an illustration of the wave forms produced with the present invention; and FIGURE 14 is an illustration of the summation signatures produced by a single reflector using different selections of frequencies.

Figure 5:
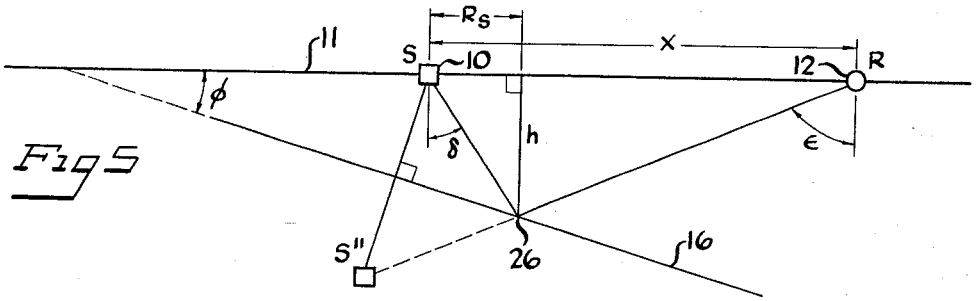
FIGURE 5 is a diagrammatic illustration of the geometry of the present invention.

In FIGURE 1 is illustrated generally a geometrical arrangement of seismic sources and receivers useful in the system of the present invention. In a preferred embodiment of this system, as illustrated in FIGURE 1, a plurality of seismic sources 10 are equally spaced along a relatively straight line 11, and a plurality of seismic receivers or detectors 12 are likewise equally spaced along the same straight line 11. Generally speaking, this straight line lies along the surface of the earth.

As noted above, each of the seismic sources 10 may be of the form shown and described in the aforesaid copending application of Miller, now Patent No. 3,282,371, or it may be of the form shown and described in the aforesaid copending application of Miller et al., Ser. No. 382,304 filed July 13, 1964. Each of the receivers 12 may be one or more conventional geophones which convert received seismic waves into a corresponding electrical detection signal which is operated upon and recorded in a recording system 13.

The source as described in each of the aforementioned copending patent applications comprises an annular plate held against the surface of the earth and driven mechanically at predetermined frequencies. More particularly, the plate is connected by a tension member to an anchor rigidly fixed in the earth. The tension in this tension member is cause to vary periodically, thus creating quasi-sinusoidally varying force on the earth under the plate. This force compresses the earth substantially sinusoidally and causes a compression wave to radiate from the plate down into the earth. These sources are capable of operating in a given anchor hole repeatedly over a long period without any substantial change in the radiated compression wave and without changing the nature of the earth in the vicinity of the source. These sources are generally installed in easily drilled anchor holes about six inches in diameter and ten feet deep. They are readily removable for transfer to other locations.

In the present system, these sources 10 are operated in accordance with a particular relative energization or phasing in order that the combination of radiated waves from all of the sources produces beam concentration and directivity. The sources 10 are operated by a master control system 14 which is preferably as described in the copending application of Dwight C. Pound, Ser. No. 382,303 filed July 13, 1964, now Patent No. 3,342,283 entitled "Control Apparatus Utilized to Produce a Beam from Seismic Sources." As described in the aforesaid application of Pound, the sources are driven at a plurality of frequencies. The sources are all driven at the same frequency at the same time, but their relative phase may be different as determined by the master control system 14. The sources are preferably driven by wave trains of finite length, each source being driven by wave trains of the same length. Thus, each of the sources produces a compressional wave identical with that produced by each of the others but with a different relative phase or onset time. In accordance with the system of the present invention, the master control system provides the relative phase or delay between the compressional waves radiated by the respective sources that causes the corresponding reflected waves picked up by a receiver 12 to reinforce each other.

In reflection seismic prospecting, the compressional waves from the seismic sources 10 are radiated downwardly and are reflected from the various strata in the earth. As shown in FIGURE 1, the waves may be reflected from the top surface 16 of a stratum 18. This stratum may lie between an overlying stratum 20 and an underlying stratum 22 and may terminate at another intersecting stratum 24. The reflection is occasioned by the change in refractive index between the stratum 20 and stratum 18.

As shown in FIGURE 1, the length of the path from source 10 to the reflecting layer 16 and back to a receiver 12 depends upon the relative position of the sources. It is the function of the master control system to provide a relative delay between the energizations of the respective sources in order that the waves from each, as reflected by the reflecting layer 16, all arrive at a given receiver 12 at the same time. A determination of this relative delay is then one bit of information which can be used in determining the dip of the reflecting surface 16. The dip is the angle of the layer relative to the horizontal.

This may be illustrated by considering the length of path from two respective sources 10 to a given receiver 12. For example, considering the path from the central source $S_5$ and the adjacent source $S_4$ to the central receiver $R_8$, the length of the path from source $S_4$ to receiver $R_8$ as reflected from the surface 16 is longer than the path from source $S_5$ to receiver $R_8$ by an amount $\Delta D$. When the master control system is properly set, the source $S_5$ will fire at a time $\Delta T_s$ after the firing of source $S_4$ such that the waves from source $S_4$ will have traveled the distance $\Delta D$ at the time source $S_5$ is activated. The time $\Delta T_s$ produces a difference in phase between the seismic waves emitted by successive sources. The time $\Delta T_s$ is thus a measure of the relative phases of the two sources. The time $\Delta T_s$ is determined by observing the response of receiver $R_8$ to the compressional waves radiated by sources $S_4$ and $S_5$ and making the two received waves coincide. This may be done by adjusting the master control system, as described in the aforesaid copending application of Pound now Patent No. 3,342,283, to provide a time delay producing a maximum reflected signal as received at the receiver $R_8$, thus indicating reinforcement of the waves by each other. The amplitude of the combined detected signals reflected from the selected stratum may be plotted as a function of the delay time, and the delay time producing a maximum signal may be measured. This delay $\Delta T_s$ is then related to the distance $\Delta D$ by the velocity $v$ of seismic waves in the earth by the relationship:

$$\Delta D = v \Delta T_s$$

The delay for maximized detected signals is indicative of the direction of the radiated waves from the source to the receiver as reflected from the reflecting surface 16.

This may be better illustrated in FIGURE 2. As a simplifying assumption, it may be assumed that the paths from the various sources to the receivers are essentially parallel. This assumption is substantially valid in all practical measurements, for the spacing of the sources is generally made very small relative to the depth of the reflecting layer 16. Generally, the spacing between sources is made of the order of about 50 feet whereas the reflecting layers of interest are ordinarily several thousand feet in the earth. With this assumption, geometrical considerations show that the angle $\delta$ between the path of the seismic waves and the normal to the line 11 may be determined by the measurement of the relative phasing or time delay $\Delta T_s$, for this angle $\delta$ is determined by the following expression:

$$\delta = \sin^{-1} \frac{v \Delta T_s}{\Delta S}$$

where $S$ is the spacing between the successive sources.

It is further evident from FIGURE 1 that similar geometric configurations apply to the direction and relative time of travel of the waves from a given source to successive receivers upon reflection from the reflecting surface 16. Thus, comparison of the time of receipt of the wave at successive receivers may be measured. The time difference $\Delta T_r$ may be used to determine the angle $\epsilon$ between the received wave and the normal to the surface of the earth by the relationship:

$$\epsilon = \sin^{-1} \frac{v \Delta T_r}{\Delta R}$$

where $\Delta R$ is the spacing between successive receivers.

This is evident from FIGURES 3 and 4 where the waves from source $S_5$ are reflected from the reflecting surface 16 to successive receivers $R_8$ and $R_9$. As in optics, the geometry can be determined by considering the source $S_5$ to be located at its image $S''_5$.

It is within the scope of the present invention that the time difference $\Delta T_r$ be determined in substantially the same manner as $\Delta T_s$. That is, the detection signals from the respective receivers can be relatively delayed and then combined, with the delay adjusted to provide the maximum combined detection signal. This delay is then a measure of $\Delta T_r$. This delay may be effected electronically or mechanically, as by separately recording each detection signal and then relatively moving the recording media until a maximum is reached.

It is also within the present invention to adjust the source delay to maximize the combined detection signal; however, since the receivers are relatively close together, it has proven satisfactory to adjust the source delay for a maximum for a single received signal, preferably that at the central receiver $R_8$.

In practice it has proven satisfactory not to combine the signals from the various receivers but rather to record each separately as a function of time and then to measure the difference in time of arrival at respective receivers of reflections from the selected stratum.

The identification of a particular reflected signal with the selected reflecting stratum will be discussed below in connection with the description of the preferred manner of producing sharp signals.

Given the above assumption that the sources are spaced close together relative to the depth of the reflecting stratum and that the receivers are similarly relatively close together, the geometry is as shown in FIGURE 5. The angles $\delta$ and $\epsilon$ may be determined as above and the distance between sources and receivers may be measured. The waves from all of the sources 10 are reflected from substantially the same point 26 on reflector 16 to the receivers 12. The angle of dip of the reflector 16 with respect to the line 11 is the angle $\phi$. Inasmuch as the angle of incidence of the waves equals the angle of reflection, the angle $\phi$ is equal to one half the difference between $\epsilon$ and $\delta$, i.e.

$$\phi = (\epsilon - \delta)/2$$

Geometrical considerations also make it evident that the velocity $v$ can be determined from its relation to easily measurable quantities:

$$v = \sqrt{2x/t \left( \frac{\Delta T_r}{\Delta R} + \frac{\Delta T_s}{\Delta S} \right)}$$

where $x$ is the distance between the sources and the detectors, and
$t$ is the time between initiation of the seismic waves by the sources and the detection of the reflection from reflector 16.

This value of velocity can be used with the above equations to determine the angles $\epsilon$, $\delta$ and $\phi$. Similarly, the distance, $h$, from the line of sources 10 and receivers 12 to the point of reflection 26 can be determined trigonometrically, as can $R_s$, the distance along said line from the sources 10 to the point of reflection 16.

It should be noted that the relationships set forth above for determining dip, depth and velocity are only approximate and apply only under limited conditions, i.e., where the separation of sources and receivers is small relative to the depth of the reflecting stratum. The system as described may be similarly operated under other conditions using more rigorous equations developed from the exact geometries used. The above relationships however have the advantages of being simple and generally applicable.

It may be noted that the information thus obtained with the array as shown in FIGURE 1 does not determine the true dip and depth of the stratum 16. It merely determines the relationship of the stratum to the line 11 in the plane of the line and a normal to the stratum. The true dip of the stratum is the dihedral angle formed by the stratum and the horizontal and its true depth is its vertical depth from the surface of the earth. To determine these, one may determine the angle of the plane of the detected reflected waves with respect to the vertical. This may be done by turning the array by 90° and making a similar measurement; this gives the apparent dip of the stratum in another plane. The true dip and depth can then be determined trigonometrically.

Figure 6:
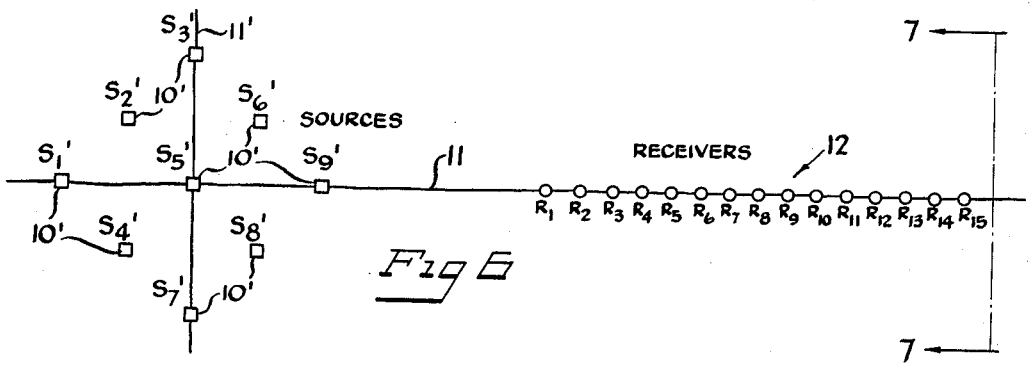
FIGURE 6 is a diagrammatic illustration showing a top view of a two-dimensional array of sources and its relationship to the receivers.

Alternatively, the source array may be two-dimensional and delay-tuned in two directions at the same time for maximum detected signal. One such two-dimensional array is shown in FIGURE 6 where the sources 10' are laid out in a diamond with one diagonal along the line 11 and the other diagonal along a line 11' at right angles to line 11. For dip and depth relative to line 11, the geometrical considerations are similar to those of the array of FIGURE 1. For the added dimension, the geometry can be better understood by reference to FIGURE 7.

Figure 7:
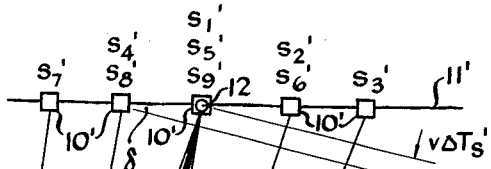
FIGURE 7 is an end view of the lay-out of FIGURE 6 taken along line 7—7.

FIGURE 7 shows an end view of the arrangement of FIGURE 6 taken along the line 7—7. The receivers 12 are superimposed upon the central source S'$_5$ in this view. By making the same adjustment of delayed tuning or relative phase as described above in connection with sources 10, the reflected signals received at a receiver 12 will be in phase for all of the waves initiated by the respective sources 10'. Similarly to the arrangement shown in FIGURE 1, the angle of the path from the sources 10' to the reflector 16 and back to the receivers 12 may be determined from this time delay by the same relationship, that is, $$\delta' = \sin^{-1}\frac{v\Delta T'_s}{\Delta S'}$$

where $\delta'$ is the angle between the normal to line 11' and the direction of the wave from the sources 10',
$\Delta T'_s$ is the time delay between the energization of successive sources, and
$\Delta S'$ is the spacing between adjacent sources 10' in the direction of the line 11'.

The velocity $v$ is the same velocity as determined above with the array of FIGURE 1.

Figure 8:
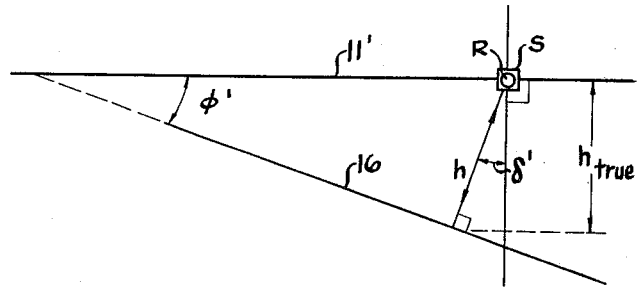
FIGURE 8 is a diagrammatic illustration of the geometry of the form of the invention illustrated in FIGURES 6 and 7.

Making the same assumption as before, i.e., that the sources are spaced close together relative to the depth of the reflector 16, the path of detected reflected waves will be as shown in FIGURE 8. Since the detector and source are at the same place in the view shown in FIGURE 8, the wave path is along a line perpendicular to the reflector 16 as shown in this view. Thus, the dip $\phi'$ of the reflector as shown in this arrangement is equal to the angle $\delta'$:

$$\phi' = \delta'$$

With this additional information, the information obtained from the collinear array of FIGURE 1 may be used to determine the true depth of the reflector $h_{true}$ and the true angle of dip of the reflector as well as the true strike, i.e., the intercept of the stratum with the surface of the earth.

It should also be noted that the lines 11 and 11' are not necessarily horizontal as the surface of the earth is not always horizontal. The relationship of these lines to horizontal can be determined by ordinary surveying techniques, and the determinations of true dip, strike and depth can then be accurately made by introducing any needed correction into the determinations made relative to lines 11 and 11'.

It may be noted in FIGURE 1 that a linear array of nine sources is shown. It has been found particularly useful to utilize an array of this nature. A relatively large number of sources improves the directivity of the seismic waves. A large number of sources also reduces the effects of surface or other local anomalies by averaging them out. That is, a single source or a very few sources might be greatly influenced by some local aberration that could produce an inaccurate measurement; however, any error in one measurement is swamped by the presence of a great number of accurate measurements. However, there is a point of diminishing returns beyond which the additional gain is not worth the additional equipment with its attendant cost and complexity. It has been found that more than about 5 sources provide the desired accuracy but that beyond about fifteen sources, the additional directivity is relatively small. Therefore, nine or eleven sources is the preferred number. An odd number of sources is preferred as a matter of convenience because it provides a central source as an origin of measurements. As noted above, the spacing between successive sources is preferably of the order of 50 to 100 feet. The spacing between successive receiving stations may be of the same order. Desirably, the spacing should be small relative to the depth of reflecting strata of interest for the simplified relationships to hold precisely. As shown in FIGURE 1 fifteen receiver stations may be used. It has proven convenient to use between eleven and twenty-five receiver stations, also equally spaced of the order of fifty to one hundred feet apart.

In any seismic system, it is necessary to couple a certain amount of energy into the earth and to measure the time it takes for this energy to reach a particular reflecting stratum and be reflected to a receiving station. Single pulses of seismic energy may be used in the manner described above; however, the preferred form of the present invention utilizes a wave train, for additional energy may be coupled to the earth over a longer period. On the other hand, although a continuous signal would couple still more energy to the earth, this would result in a confusing detection signal, for the waves would be reflected continuously from a large number of reflectors and particular reflecting strata would not be identifiable. It is necessary to relate the time of arrival of the wave to its time of origin. It is thus preferred to utilize wave trains of limited length. More particularly, in accordance with the preferred mode of operation of the present system, wave trains of different frequencies are utilized, and the records made at the respective frequencies are combined in a particular manner to sharpen the resultant combined signal, that is, to make it much shorter than the length of the transmitted wave train.

Further, the effect of noise may be much reduced by detecting each frequency through its own narrow band filter. It would be possible to reduce noise by utilizing cross correlation techniques between the sent and received signals; however, it is preferred in the present invention to utilize simple filters which operate in real time. When utilizing wave trains of finite length, the output of such filters gradually increases, reaching a peak with the last wave of the train and thereafter gradually diminishing. It is an important feature of the present invention to combine the outputs of the filters at all frequencies in such manner that all signals are substantially in phase at a particular time, namely at the time of the last transmitted wave, and on the average cancel one another out at all other times, thus providing a sharp combined signal.

The frequencies used will be discussed below. They are produced by the sources 10 under the control of the master control system 14 as described in the aforesaid copending application of Pound. The reflected waves at each frequency are detected by all of the receivers 12.

In FIGURE 9 is shown a part of the recording system 13 including only one receiver channel. The entire recording system 13 includes a duplicate of the circuit shown in FIGURE 9 for each of the receivers 12. The electrical signal produced by a receiver 12 in response to the reflected waves is applied to a filter 28 narrowly tuned to pass waves of the frequency transmitted by the sources for the particular wave train being detected. The signal passed by the filter 28 is then recorded on a corresponding recorder 30. In order that the record made on recorder 30 be related to the time of travel of the waves fom the said sources, the recorder cycle is related to the master control either by having the master control start the recorder time or by having the recorder cyclical, as by using a rotating magnetic drum recorder and starting the operation of the master control circuit at a particular time in the recorder cycle, as by using a microswitch at a particular point on the drum of a recorder. It is also possible to have a receiver station at the center of the source array to measure the time of initiation of the seismic waves and to utilize the output of this receiver to time the recorder. In any event, in some convenient and conventional manner, the time of the record made upon the recorder 30 may be related to the initiation of the seismic pulse and thus provide a record of received waves as a function of time with the time of energization as a reference datum. For each frequency as controlled by the master control 14, a frequency control switch 31 switches components in the filter 28 to tune the filter to that frequency. At the same time, the frequency control switch is ganged by a shaft 33 to a switch 32 which functions to switch the output of the filter 28 to a recorder 30 which then records the signal for the respective selected frequency. The result is that the reflected signal at each frequency is recorded on a respective recorder 30. In fact, each recorder 30 may be a separate track on a single magnetic recording drum.

Inasmuch as each record is a measure of the detected seismic wave as a function of time related to a reference datum, e.g., the time of the energization of the sources at a respective frequency, the records may be arranged so that the reference data coincide, and the records then combined. The records as recorded on each of the recorders 30 are combined by a read out device 34, which may be a single pick up head covering all the recording tracks of the drum of the recorder, and the combined signal is then recorded as a function of time upon the summed signal recorder 36. The summed signal recorder 36 makes a separate record for each of the receiver channels, all related to the same time of energization of the sources and thus permitting measurement of the difference in time of receipt of particular reflections at the respective geophones.

It has been found preferable to utilize as a filter a so-called operational filter in the form of a narrow band active filter having adjustable frequency and Q controls. The filter is based upon the analog simulation of the differential equation of a damped linear oscillator that is excited by an input signal of the resonant frequency. The frequencies and Q controls are adjusted to provide a filter response approximating the correlation function for the particular wave train frequency and length. The differential equation is:

$$\frac{d^2x}{dt^2}+\frac{\omega}{Q}\frac{dx}{dt}+\omega^2 x = \omega^2 x F(t)$$

where $F(t)$ is the input function which contains a desired seismic reflection signal characterized by the effective resonant filter frequency mixed with varying amounts of noise.

This converts to $$\frac{1}{\omega}\frac{d^2x}{dt^2}=[F(t)-x]\omega-\frac{1}{Q}\frac{dx}{dt}$$

which can be set up in analog form as in FIGURE 10.

It should be noted that $\omega$ for a 100 c.p.s. signal would be 628 while a coefficient potentiometer yields a number only from 0 to 1. For this reason the $\omega$ setting is really $\omega/1000$ and both such settings are followed by integrators with a gain of 1000 to compensate. This also keeps the integration capacitors from being excessively large.

The basic schematic is preferably as shown in FIGURE 11.

The filter includes amplifiers 38, 40, 42 and 44. Amplifiers 38, 40 and 42 may be small conventional operational amplifiers having a frequency response of 0 to 10 kilocycles. Amplifier 44 may be a symmetrical emitter follower to provide a low impedance output. Amplifier 38 is part of a summing amplifier 46 to which an input signal is applied at each of input resistors 48 and 50 and which includes a feedback resistor 52. Potentiometer 54 is a frequency control coupled between the output of summing amplifier 46 and an integrating amplifier 56 having input resistors 58 and 60, amplifier 40 and a feedback capacitor 62. The output of the amplifier 56 is applied to another potentiometer 64 which is also a frequency control. The output from the frequency control 64 is applied to a potentiometer 66 which is a Q control and is also applied through an input resistor 68 which is part of an integrator 70, which also includes amplifiers 42 and 44 and feedback capacitor 72. The signal from the Q control 66 is applied through resistor 60 to integrator 56. The output of the integrator 70 is then the filter output passed to a recorder 30. It is also fed back to an input of the amplifier 46.

The operation of the amplifier may be readily understood by reference to FIGURE 10 which is a functional illustration of the filter. The operational filter is normally adjusted so that the buildup of the filter output over the duration of a single idealized reflection signal and the ringing decay of the filter after the cessation of the signal form an approximately triangular envelope. Amplifier 46 sums its input signals $-F(t)$ and $x$ and inverts the sum to produce a signal $F(t)-x$. Potentiometer 54 (with appropriate amplifier gain) multiplies the sum by $\omega$ to produce a signal $[F(t)-x]\omega$. Integrator 56 adds this signal to a signal representative of $$-\frac{1}{Q}\frac{dx}{dt}$$

to produce a signal $$[F(t)-x]w-\frac{1}{Q}\frac{dx}{dt}$$

which as noted above is equal to $$\frac{1}{\omega}\frac{d^2x}{dt^2}$$

integrator 56 then integrates this to produce a signal $$-\frac{1}{\omega}\frac{dx}{dt}$$

which is multiplied by $\omega$ by potentiometer 64 (with appropriate amplifier gain) to produce a signal representative of $-dx/dt$. This signal is multiplied by $1/Q$ by the Q control potentiometer 66 to provide an input signal for integrator 56. It is also integrated to produce the signal $x$ which is the filter output and also an input signal to amplifier 46.

The filter 28 is tuned by the adjustment of potentiometers 54 and 64. The adjustment may be made by movement of the frequency control switch 31 to provide the appropriate frequencies, or the switch may switch different preset components for potentiometers 54 and 64, the components being preset to provide the predetermined frequencies. The Q control 66 may be similarly adjusted.

The operational filter as described in connection with FIGURES 10 and 11 features independent frequency and Q controls. However, in the case of a seismic system utilizing sets of frequencies and numbers of cycles such that all pulse trains used are of approximately equal time duration (period x number of pulses=constant), it is desirable to use a filter wherein the Q control is proportional to frequency while the frequency control is independent of Q. This can be accomplished by the filter shown in FIGURE 12.

A filter like that shown in FIGURE 12 is described in an article by F. T. May and R. A. Dandl, "Active Filter Element and Its application to a Fourier Comb," Review of Scientific Instruments, April 1961, volume 32, No. 4, page 387. This circuit requires only a single frequency control rather than the dual frequency control of the filter of FIGURES 10 and 11, and provides the desired frequency dependence in the Q control. The bandwidth and gain of this circuit are substantially identical to those of the circuit shown in FIGURES 10 and 11. The pertinent relations are as follows:

$$f \text{ resonance} = \frac{\sqrt{\alpha}}{2\pi R_1 C_1}$$

$$Q = \frac{\sqrt{\alpha}}{\gamma}$$

$$\alpha = \frac{Rf}{R_1}$$

$$\gamma = \text{Ratio on } R_3$$

$$\text{Bandwidth on long wave train} = \frac{\gamma}{R_1 C_1}$$

$$\text{Gain at } f \text{ resonance on long wave train} = \frac{\alpha}{\gamma}$$

The Q, controlled by $\gamma$, need only be set once for a particular time length of pulse train, and the only control requiring switching during seismic work is the single frequency ($\alpha$) control. Thus, the control $\gamma$ can be adjusted to provide the desired Q, at a particular frequency for a wave train of the length being used, to produce the desired rate of rise and fall in the filter output. This setting of the control $\gamma$ then provides the desired Q for all other frequencies as determined by the control $\alpha$, the Q being also determined by the control $\alpha$ and hence being frequency dependent. This produces a Q that increases with frequency, which is desirable in view of the normal increased attenuation of the higher frequencies in the transmission of seismic waves.

The filter shown in FIGURE 12 is particularly adaptable to switching elements in a filter 28, for only the switching of a single element, i.e., $R_f$ is required. That is, the frequency control switch 31 simply switches in different values of $R_f$ to change the frequency of the filter, at the same time being ganged to switch 32 to connect the filter to a different recorder 30 (likely to a different channel or track of multi-track recorder).

An alternative to the operational filters described is a filtering technique known as delay filtering. Delay filtering may be used to enhance a signal whose frequency and duration is known, as is the case here. It is achieved by recording the unfiltered signal from the geophone and performing repeated additions of the record with successive delays of one period, two periods, three periods, etc. The number of addends is equal to the number of cycles in the original input signal. The delaying may be performed conveniently either by relative drum rotations or by rotation of the recording heads. The original record may be played successively $n$ times onto a second recording medium, where $n$ is the number of cycles in the applied wave train, with a delay of one period between successive records. The $n$ records may each be on a separate recorder track and all tracks may then be read out simultaneously by a single recorder head to provide the required output signal.

Delay filtering would be applied to each frequency record for each geophone. In the case of an applied wave train $n$ cycles long, the envelope resulting from the addition $n$ times of the record would be triangular with a peak $n$ units high. The length of the envelope would be twice the length of the applied pulse. The resultant signal would be substantially equivalent to the record made on a recorder 30 in the circuit shown in FIGURE 9 and may be similarly utilized. That is, the resultant signals for all frequencies may be added together with the same proper phasing. Delay filtering has the advantage that the envelope cuts off sharply outside a time span twice as long as the applied wave train, but it has the disadvantage of requiring more time for processing, as the processing cannot be performed in real time.

An important condition for the successful operation of the apparatus shown in FIGURE 9 is that the received wave trains for all frequencies be combined in the time relationship wherein detected wave trains corresponding to the applied wave trains without passage through the earth are all in phase during one cycle of each, more particularly that they be in phase during the cycle corresponding to the last cycle of each applied wave train. The "time relationship wherein detected wave trains corresponding to the applied wave trains without passage through the earth are in phase during one cycle of each" means and includes the relationship wherein all of the phase shifts in the system itself are taken into account but excluding the phase shifts occasioned by the passage of the waves through the earth. This is the time relationship where the peak signals of all of the respective signals recorded on the recorders 30 coincide in time when the detector is responding to the applied seismic waves directly without their transmission through the earth. This is achieved by proper setting of the master control system so that each applied wave train terminates in a final wave at the proper time in the operational cycle of the system, that is, at a particular time after a reference datum or reference time. This reference datum is the reference datum for the recorder 30, and if the final cycle of each pulse train occurs at the proper time interval after the reference datum for each frequency and the reference data for the records made by all of the recorders 30 are made to coincide, the detected waves at the various frequencies will all be in phase at the time corresponding to the receipt of the final cycle of the respective applied wave trains from the various reflectors.

The records made by the respective recorders 30 are made with coinciding reference data. This may be achieved by suitable programming of the master control system. This setting of the master control system is readily achieved in advance of actual seismic operations by utilizing a test receiver at the central source 10, as will be discussed further below.

The frequency summation technique is illustrated in FIGURE 13. All of the traces in this figure were taken directly from actual field records. In this particular operation, six frequencies were used at 90, 79, 68, 57, 46 and 35 cycles per second, respectively. The records as made on respective recorders 30 are shown as traces A, B, C, D, E and F, respectively. Each of these records was made through a narrow band filter 28 which was switched to be tuned to the respective frequency. The records made on recorders 30 are normally in the form of magnetic records. However, they are shown in FIGURE 13 as retranscribed on a recording oscillograph.

The summation of signals A, B, C, D, E and F by the readout device 34 as recorded on summation recorder 36 is shown as trace G. It should further be noted that the delay tuning of the sources was adjusted for three milliseconds, which was the delay maximizing signals in the time region around one second. With this delay and frequency summation, two reflectors are evident in the region around one second, the reflectors being identified as peaks 74 and 76 on the trace G.

These actual traces and the frequency summation record as shown in FIGURE 13, graphically illustrate the effect of this frequency summation technique. It is evident that none of traces A, B, C, D, E and F by itself clearly delineates the positions of the reflecting strata. However, the summation record G clearly identifies reflecting strata in much the same way as they are identified on conventional seismograms. The characteristic wavelet indicating a reflecting stratum is known as the reflection signature of that stratum. Inasmuch as the summation record looks very much like conventional seismic records, it may be interpreted following conventional seismic techniques. However, the manner in which the seismic record is made provides emphasis of certain reflecting strata under conditions where conventional seismic techniques have failed. In particular, it is shown how reflecting surfaces lying very closely together may be differentiated.

The resolution effect of frequency summation is best illustrated by comparison with monochromatic signals under identical conditions. Trace H of FIGURE 13 is an 80 c.p.s., 8 cycle pulse record, unfiltered, with the same source-receiver geometry as the frequency summation record. The primary source delay time in both cases tunes in the time region around 1.0 second. The signals in this time region are well resolved by the frequency summation technique but are obscured by overlap and interference in the monochromatic record. In particular, one may note the sharp resolution of the closely-spaced signals 74 and 76 in the frequency summation trace (G), as compared with the relatively long, undifferentiated pulse train in the monochromatic record (H).

There are a number of criteria for obtaining an optimum signature. It is desirable that this signature be relatively sharp and distinctive. In order that the signature be sharp, it is necessary that the detected wave trains reflected from a particular reflector reinforce each other over a relatively short period of time and combine destructively over other intervals. It has been discovered that the linear frequency distribution has generally small side lobes, thus emphasizing the principal peak. The largest side lobes are those created by the beat frequency arising from the common frequency difference. However, these side lobes created by the beat frequency can be eliminated by a suitable choice of lengths of wave trains. By a linear set of frequencies is meant a number of frequencies having a constant frequency difference between successive frequencies. It does, however, include a linear set where one or more of the members of the set are omitted.

The following criteria are important for good signature generation:

(1) A high average frequency should be used to obtain a high resolution signature; that is, the higher the frequency used, the sharper the main peak of the summation record. The frequency, however, is limited by the physics of the source and the earth. The higher frequencies are difficult to radiate and transmit with efficiency.

(2) A wide range of frequencies should be employed, ranging from the highest to the lowest values at which good radiation and transmission efficiency are achieved. A wide range is desirable for minimizing the side lobes.

(3) A large number of different frequencies is desirable for the general reduction of side lobes. The number selected should be consistent with economic field equipment and operation costs. With a set of fixed frequenceis made readily available by programming or easy switch selection, the shooting of a number of different frequencies should occupy essentially no more time than shooting the same number of shots at a smaller number of frequencies. A large number of frequencies would have the basic advantage of providing a nearly continuous range of fixed, but closely spaced, frequency wave trains. Dropping out one, or even a few frequencies to avoid particular interfering peaked noises would be possible without too deleterious an effect on the signature. Additional frequency units at either end of the main distribution would enable a selection of the frequency range to fit the particular field condition.

(4) Generating operational filter outputs of roughly the same amplitude is desirable to achieve a uniform representation of all frequencies in the signature. Constant amplitude outputs may be achieved either by gain adjustments, or by multiple shooting where particular frequencies are transmitted with high attenuation. The use of a filter having a Q that increases with frequency, e.g., the filter shown in FIGURE 12, helps to keep up the amplitude of the normally more attenuated signals at the higher frequencies.

(5) A linear frequency distribution gives generally small side lobes, except for the large beat frequency lobes arising from the constant frequency interval. These side lobes are located at $1/\Delta f$ seconds from the central signature, where $\Delta f$ is the constant frequency difference. A large number of frequencies assists in positioning these side lobes far from the central signature.

(6) The length of the applied wave trains should be sufficiently long to give a good signal-to-noise ratio but should be shorter than $1/\Delta f$, so that the side lobes are moved out beyond the limits of the applied wave trains.

(7) The frequencies should be selected so that the detected wave trains can be in phase with each other substantially only during one cycle thereof, in particular during the cycle corresponding to the last cycle of the respective applied wave train.

(8) The frequencies should be selected to avoid the ground roll frequency and any other noise frequencies, in particular 60 cycles per second. Ground roll is noise created by the seismic sources in the surface layers of the earth. In conventional seismic operations, the ground roll often obscures desired reflection signals by arriving at the same time and with a comparable amplitude. The sources preferred for use in the present invention minimize ground roll; further, ground roll, being generally random, is relatively reduced by the multiplicity of the sources. Moreover, ground roll is generally present over somewhat limited frequency ranges, for example about 10–30 cycles per second, and the effect of the ground roll can therefore be substantially reduced by excluding this frequency from the measurements. This may be done by appropriate selection of the filters 28 and by not generating any pulse trains at the same frequency as the ground roll.

In summary, the summation signature has a width determined by the average frequency, and the side lobes are decreased as the range of the frequency increases. The number of frequencies is apparently not critical; however, a larger number reduces the side lobes. The exact value of the frequencies is not critical except that they should be selected so that the signals are never in phase except for one time within the total time spent by the original signals.

Empirical investigation indicates a linear distribution of frequencies to be preferable to other distributions investigated. One unsatisfactory feature of the linear distribution is the existence of two large side lobes arising from the common difference or beat frequency among the individual frequencies. These two side lobes may be eliminated or else reduced substantially, depending upon the filtering process used, by choosing a length of applied wave train and frequency difference combination which places the side lobes out beyond the time limits of the wave train. Elimination of the side lobes is achieved when delay filtering is used preparatory to frequency summation for pulse compression; reduction of the side lobes is achieved when operational filters are used.

Let us consider a linear distribution of 15 frequencies with a constant frequency interval given by $\Delta f$ cycles per second. When long wave trains of these frequencies are summed together, there will be produced beats at a beat frequency of $\Delta f$. The time interval between the in-phase beat peaks will be $1/\Delta f$.

On a seismic record resulting from the summation of waves of constant amplitude there will appear a series of large in-phase peaks at time intervals of $1/\Delta f$ separated by regions of considerably smaller oscillations due to the addition of the more random phases.

Suppose now that, rather than constant amplitude wave trains, the wave trains to be combined are of such phase, shape and length that the wave pulse obtained by adding the different trains is centered about an in-phase peak and encompasses a time span for appreciable amplitude of less than $2/\Delta f$, this being the type of wave train existing at the filter output. Thus, there would be produced only one central in-phase peak, with the adjacent in-phase peaks being either absent or of negligible amplitude, and the small oscillations surrounding the single central signature decreasing in amplitude as one goes away from the central peak.

The design criterion that the time span of the summed wave encompasses less than $2/\Delta f$ means, in the case of delay filtering, that the time span of the input pulses to the delay filtering be less than $1/\Delta f$. Elimination of the side lobes would occur in this case. In the case of operational filtering before summing, the criterion would mean that the input pulses to the operational filters would have a time span less than $1/\Delta f$, and further that the decay in the output of the operational filter would fall substantially towards zero within a time of $1/\Delta f$. In the case of operational filtering the side lobe at $1/\Delta f$ seconds later than the main peak would be reduced substantially but not eliminated.

The actual length T of the wave trains may be given by the relationship $$T = \frac{n}{f}$$

where $n$ is the number of cycles per pulse, and $f$ is the frequency in cycles per second.

According to the criterion, this length T should be less than $1/\Delta f$. If we let $$\frac{1}{\Delta f} = \frac{n+m}{f}$$

where $m$ is a positive constant not necessarily an integer, then the criterion is fulfilled.

As an example, a value of $m=1$ may be chosen. The number of cycles and the frequencies will then be given as follows:

21 cycles of 99 c.p.s.
20 cycles of 94.5 c.p.s.     15 frequencies
19 cycles of 90 c.p.s.       $\frac{1}{\Delta f} = \frac{n+1}{f} = \frac{1}{4.5} = 0.222$ sec.
18 cycles of 85.5 c.p.s.     $\Delta f = 4.5$ c.p.s.
17 cycles of 81.0 c.p.s.
16 cycles of 76.5 c.p.s.     $T_{99} = 0.212$ sec.
15 cycles of 72 c.p.s.
14 cycles of 67.5 c.p.s.     $T_{36} = 0.194$ sec.
13 cycles of 63 c.p.s.
12 cycles of 58.5 c.p.s.
11 cycles of 54 c.p.s.       $f_{average} = 67.5$ c.p.s.
10 cycles of 49.5 c.p.s.
9 cycles of 45 c.p.s.
8 cycles of 40.5 c.p.s.
7 cycles of 36 c.p.s.

One, among many advantages of the 15 frequencies is that dropping one, or even a few, to avoid particular ambient noise frequencies, would have a small effect on the signature character. Also, additional frequency values may be added at either end and the distribution shifted up on down as desired, without serious signature degradation.

Tests with a single reflector and the above set of frequencies resulted in the summation signature indicated by trace A of FIGURE 14. The effect of proper selection of frequencies may be graphically illustrated by reference to trace B of FIGURE 14 which was obtained utilizing a linear set of eight frequencies between 24 and 101 cycles per second. The interval $\Delta f$ of 11 milliseconds gave large side lobes at 90 milliseconds, whereas the interval $\Delta f$ of 4.5 milliseconds used to produce trace A would place the side lobes at 222 milliseconds from the central peak, which is too far out to appear with appreciable amplitude using pulse lengths from 194 to 212 milliseconds.

A set of frequencies found particularly useful in practice is the linear set of 15 frequencies beginning with 18 cycles per second and with a difference $\Delta f$ between successive frequencies of 4.5 cycles per second. The wave train at 18 cycles per second is 4 cycles long and at 81 cycles per second 18 cycles long, with corresponding numbers of cycles for the intermediate frequencies as provide wave trains of about the same length.

Given that the frequencies for the pulse compression have been selected, there remain two adjustments critical to the proper generation of an optimum frequency summation signature. One of these is the timing of the pulse onset to ensure that the central major peaks of the recorded filter outputs at all frequencies are recorded in-phase for summing. The other is the adjustment of the amplitude of the individual frequencies.

The setting of the pulse onset timing associated with each frequency is quite critical. Experience has shown that the onset time is satisfactory when determined within a millisecond or better. The onset time is set for each frequency by means of the master control system, as discussed previously. Once this time is determined for a given system it need not ordinarily be readjusted except possibly for extreme variations in field conditions.

This onset time must bring the principal, or central, peaks of the operational filter outputs into coincidence. It includes all of the phase shifts present in the system, including the response of the source itself. A satisfactory procedure for determining the frequency onset times is by placing a geophone in the ground adjacent to one of the sources and then firing the source at the various frequencies and recording. The geophone signal is recorded through the regular geophone amplifier with the operational filter 28 tuned to the particular frequency. The master time delay settings for the various frequencies are adjusted until the desired frequency peaks line up properly on the records. The frequency onset times thus determined may then be used for all subsequent shooting.

In a preferred embodiment of the invention, the recorder is of the magnetic drum type having a plurality of recording channels axially displaced along the surface of the drum, and rotating at a constant velocity to provide a recording period of several seconds. A particular point in the recorder cycle may be used as a reference datum or "time zero." This point may be identified and signified by a time marker coupled to the recorder drum, e.g., by a microswitch closing a circuit, which operates at that point in the cycle to produce a reference pulse indicative of the reference datum or time zero. Since all recorder channels are on the same drum, this pulse identifies the same point in the cycle for each channel and hence each signal recorded at a respective frequency. The reference pulse may then be applied to the master control system to initiate its operation. In order that the recorded signals in the respective channels are in the proper relative phase for pulse compression in accordance with this invention, the beginning of the wave train applied by the seismic sources may be adjusted relative to the reference datum by a conventional adjustable time delay mechanism such as a monostable multivibrator of adjustable period or an oscillator and counter operated as an electronic clock. A different delay for each frequency insures that the signals in the respective channels are appropriately timed relative to the reference datum so that the signals of all channels may be summed to provide the compressed signature as described above. This is because the reference data for the respective channels inherently coincide when all channels are recorded on the same drum.

As noted above, the proper timing as thus achieved provides the combination of respective detected or recorded wave trains in what has been referred to herein as "the time relationship wherein detected wave trains corresponding to the applied wave trains without passage through the earth are in phase during one cycle of each," in particular, the last cycle.

As pointed out earlier, the best signatures appear to be generated with filter outputs of approximately equal amplitude. A factor of 2 in amplitude has proven tolerable.

In making the amplitude adjustments to bring the outputs to approximately the same amplitude, it is important that interference phenomena arising from multiple reflectors be carefully avoided. Accordingly, the amplitude setting for a particular frequency should be based upon the average amplitude over a considerable portion of the time scale, and not upon a particular reflection signal. Further, in the event of a relatively greater attenuation of the high frequencies with increasing depth, two or more sets of different relative amplitude settings may be made for the different depth (time) regions. Once the adjustment of gain is determined, either for the entire time span, or for several separate time intervals, it should not be changed during the shooting even though it appears that for certain reflectors a particular frequency has abnormally low or high amplitudes. The abnormally low or high amplitude may have arisen because of interferences between two or more reflectors.

It is inherent in the nature of the frequency summation signature that these interference effects maintain their actual amplitude so that the interfering reflectors will display their individual signatures with proper spacing.

As mentioned above, there may occur a relative dependence of the received amplitude upon frequency which varies with travel time. This relative amplitude dependence upon frequency arises from the generation, transmission and reflection processes. In some regions, the high frequencies are increasingly relatively more attenuated, whereas in others they come through with uniformly good relative strength. In those field cases in which the amplitudes of the high frequency reflections need extra boosting, it is often desirable to shoot the high frequencies a greater number of times before summing with the lower frequencies.

Often it is possible to equalize the detection signals by adjusting the source output or the amplification in the various recorder channels. However, this is limited by the capabilities of the sources and the amplifiers used. There is a practical limit to the amount of energy that can be radiated by a source of reasonable size while remaining within the elastic limits of the earth to which it is coupled. Amplification can make up for this only to the extent that the signal-to-noise ratio is adequate. Further, the amplifiers used must not introduce excessive phase shift or the signals at the various frequencies will not combine properly. Under such circumstances the detection signals can be equalized by multiple shooting at the higher frequencies. That is, several channels may be shot at the same frequency. Each of the detection signals at this frequency may then be recorded on a separate recorder channel. These several channels would then together contain the equalized signal for this frequency, to be summed together with signals of the other frequencies. This multiple shooting at a given frequency improves the signal-to-noise ratio without overloading either the sources or the detector system.

The equalization of signals not only provides the best pulse compression, but it maintains fidelity in the signatures. This is often important for, as the term implies, the signature for each reflecting stratum is characteristic of that stratum and hence may be used to identify the reflection from that stratum on different seismograms. This permits proper correlation of seismic records made at different places in the same general vicinity so that the various strata can be properly related in a geophysical study of an extended area where the arrays of sources and detectors are operated at a number of different locations.

The term fidelity as applied herein to a seismic signature is an adaptation from the use of the term in music reproduction. The fidelity of representation of the seismic signature, as also the fidelity of the musical reproduction, depends upon the extent to which a uniform frequency response is achieved.

Seismic signatures are recognized as coming from a particular boundary by their shape and structure. However, the shape and structure of a particular observed reflection signature depends not only upon the reflection characteristics of the boundary but also upon the transmission characteristics of the wave path from source to receiver. A mechanism or procedure which provides for the maintenance of a constant amplitude frequency spectrum over different paths insures that the reflection signature will preserve the same shape and structure over those different transmission paths, thus insuring that the signature is characteristic of the reflection boundary only. Hence, a mechanism or procedure, such as increased multiple shooting at the higher frequencies, which can compensate for the relatively strong attenuation of the high frequency components and can maintain a constant amplitude of the frequency spectrum as viewed at the receiver ensures fidelity of the signature and hence produces optimum recognizability or identifiability. The above described system, which provides for separate handling of each of the component frequencies, is uniquely capable of the selective multiple shooting required to achieve the uniform frequency response for signature fidelity.

It may be noted that the delay tuning procedure and the wave train compression by frequency summing are separate phenomena each having separate utility. However, the combination provides an improved selection of information making it possible to identify reflecting strata hitherto obscure. The compression techniques provide sharper formation signatures with less noise than achieved with prior techniques. However, the addition of delayed tuning makes it possible to identify signatures otherwise obscured by other reflections. In order to emphasize particular reflectors, it is generally desirable to make a number of measurements at different delay values and determine the delay tuning that maximizes the particular reflector signatures of interest.

The compressed signature obtained by the frequency-summation procedure has an appearance similar to that of the so-called Ricker Wavelet, recognized as a standard, and to the signatures obtained by autocorrelation techniques. The narrow width of the signature, provided by the high mean frequency made possible by this system, provides for a greater time and hence depth resolution than that of the conventional systems of weight drop and dynamite. The high signal-to-noise ratio made available by the narrow-band operational filters and the frequency summation process provides a high degree of clarity of the reflection peaks and the possibility of working against strong ambient noise. The flexibility in the choice of frequencies permits the avoidance of strongly peaked ambient noises, the reduction of ground roll, special interference studies of thin reflecting layers, and other desirable features. The precise timing control and high reproducibility of the signal characteristics provide for repetitive shooting and for good fidelity of the records. The ability to produce and maintain a uniform recorded signal amplitude over the employed frequency spectrum by selective multiple shooting at each frequency insures the production of reflection signatures of good fidelity and provides easy recognizability and identifiability of the reflecting boundary. The basic features of beam directivity and reflection horizon selectivity made possible by the delay-tuning, or phasing, of the multiple sources provide a further controllable enhancement of the reflection signatures.

The above features enable the production of a seismic record which lends itself to analysis of the sub-surface detail with good resolution and high accuracy.

An additional dimension is present, however, on such seismic records, as compared with the conventional records. Each tuned reflection signature has associated with it its delay-tuned value or time shift, which with the source to receiver spacing, the time shift at the receivers, and the travel time enables the direct determination of the average wave velocity, the reflector depth and projected position on the surface, and the dip angle of the reflecting surface.

With the reflection signature obtained by the above-described pulse compression techniques, the delay-tuning is preferably achieved by sweeping the delay adjustment to determine the adjustment that maximizes the signature peak for the particular reflector to be emphasized. Under some circumstances, it may be preferable to maximize the detected signal for a single pulse or wave train of a single frequency. In any event, a number of different delays may be introduced to permit identification and utilization of that delay producing the maximized detection signal for the particular reflector.

If delay tuning is not effected, the resulting seismogram can be used as any conventional seismogram. Velocity can be estimated from other measurements, such as a velocity log or delay tuning in the neighborhood regions.

For simple geological regions, i.e., with sub-surfaces approximately parallel, the entire record span can be presented on one record by arranging properly tuned intervals in sequence, rejecting the detuned intervals. The traces can then be presented, where desired, using the standard variable-density or other presentations.

In the more complex regions, where strongly varying dip angles exist, and particularly where both positive and negative dip angles are present, the reflectors may best be presented by a series of delay-tuning sequences, possibly involving positive and negative tuning values in separate sequences. For example, in the case of shooting in the middle of a syncline, separate individual records could be displayed of the opposite sloping sides of the syncline, one record for a sequence of positive delays and the other for negative.

Although certain preferred embodiments of the present invention have been shown and described, many modifications may be made within the scope of the invention. For example, the wave trains at the various frequencies may be shot in particular sequences with but a short interval between pulses, the sequence of frequencies being selected to minimize cross-channel feed-through. It is also contemplated that the entire operation be programmed in advance, with the directions supplied to the master control system on tape. Also, as noted above, the multi-frequency operation permits identification of interference patterns indicative of the relative spacing of reflectors. Various other changes and modifications may be made in the above described embodiments without deviating from the spirit or scope of the invention. Various features of the invention are set forth in the appended claims.

What is claimed is:

1. A method of determining the time of travel of a signal through a medium which method comprises applying a signal to the medium, said signal comprising a plurality of wave trains, each of said wave trains being transmitted for a limited time at a respective substantially constant frequency, a selected cycle of each transmitted wave train being applied to the medium at a respective predetermined time relative to a respective reference time for each wave train, receiving said wave trains after their passage through the medium, applying said received wave trains to a narrow band pass active filter selectively tuned to the respective frequencies of said transmitted wave trains to produce a separate detection wave train corresponding to each of said transmitted wave trains, producing a combined signal by utilizing said reference times and said predetermined relative times to combine said detection wave trains in the time relationship wherein the detection wave trains which would be produced from said received wave trains, if said received wave trains had not passed through the medium, would be substantially all in phase during the respective cycles corresponding to said selected cycles of said transmitted wave trains, and comparing the time of occurrence of said combined signal with the times of application to the medium of said selected cycles of said transmitted wave trains to determine the time of travel of said signal through the medium.

2. A method of determining the time of travel of a signal through the earth which method comprises applying a signal to the earth, said signal comprising a plurality of seismic wave trains, each of said seismic wave trains being transmitted for a limited time at a respective substantially constant frequency, a selected cycle of each transmitted wave train being applied to the earth at a respective predetermined time relative to a respective reference time for each wave train, receiving said wave trains after their passage through the earth, applying said received wave trains to a narrow band pass active filter selectively tuned to the respective frequencies of said transmitted wave trains to produce a separate detection wave train corresponding to each of said transmitted wave trains, producing a combined signal by utilizing said reference times and said predetermined relative times to combine said detection wave trains in the time relationship wherein the detection wave trains which would be produced from said received wave trains, if said received wave trains had not passed through the earth, would be substantially all in phase during the respective cycles corresponding to said selected cycles of said transmitted wave trains to produce a combined signal, and comparing the time of occurrence of said combined signal with the times of application to the earth of said selected cycles of said transmitted wave trains to determine the time of travel of said signal through the earth.

3. A method of determining the time of travel of a signal through a medium which method comprises applying a signal to the medium, said signal comprising a plurality of wave trains, each of said wave trains being transmitted for a limited time at a respective substantially constant frequency, a selected cycle of each transmitted wave train being applied to the medium at a respective predetermined time relative to a respective reference time for each wave train, receiving said wave trains after their passage through the medium, applying said received wave trains to a narrow band pass active filter selectively tuned to the respective frequencies of said transmitted wave trains to produce a separate detection wave train corresponding to each of said transmitted wave trains, the times of application of said transmitted wave trains being selected so that each of said separate detection wave trains is substantially unaffected by transmitted wave trains other than the one to which said separate detection wave train corresponds, producing a combined signal by utilizing said reference times and said predetermined relative times to combine said detection wave trains in the time relationship wherein the detection wave trains which would be produced from said received wave trains, if said received wave trains had not passed through the medium, would be substantially all in phase during the respective cycles corresponding to said selected cycles of said transmitted wave trains, and comparing the time of occurrence of said combined signal with the times of application to the medium of said selected cycles of said transmitted wave trains to determine the time of travel of said signal through the medium.

4. A method of determining the time of travel of a signal through a medium which method comprises applying a signal to the medium, said signal comprising a plurality of wave trains, each of said wave trains being transmitted for a limited time at a respective substantially constant frequency, a selected cycle of each transmitted wave train being applied to the medium at a respective predetermined time relative to a respective reference time for each wave train, receiving said wave trains after their passage through the medium, selectively tuning a narrow band pass active filter to the respective frequencies of said transmitted wave trains, selectively adjusting the Q of said filter so that the filter response approximates the correlation function of the respective transmitted wave train, applying said received wave trains to said filter to produce a separate detection wave train corresponding to each of said transmitted wave trains, producing a combined signal by utilizing said reference times and said predetermined relative times to combine said detection wave trains in the time relationship wherein the detection wave trains which would be produced from said received wave trains, if said received wave trains had not passed through the medium, would be substantially all in phase during the respective cycles corresponding to said selected cycles of said transmitted wave trains, and comparing the time of occurrence of said combined signal with the times of application to the medium of said selected cycles of said transmitted wave trains to determine the time of travel of said signal through the medium.

5. A method of determining the time of travel of a signal through a medium which method comprises applying a signal to the medium, said signal comprising a plurality of wave trains, each of said wave trains being transmitted for a limited time at a respective substantially constant frequency, a selected cycle of each transmitted wave train being applied to the medium at a respective predetermined time relative to a respective reference time for each wave train, receiving said wave trains after their passage through the medium, selectively tuning a narrow band pass active filter to the respective frequencies of said transmitted wave trains, selectively adjusting the Q of said filter so that the filter output in response to each of said transmitted wave trains rises substantially to its steady state over a time equal to the duration of said transmitted wave train and falls to about one fourth its maximum amplitude over a time equal to the duration of said transmitted wave train, applying said received wave trains to said filter to produce a separate detection wave train corresponding to each of said transmitted wave trains, producing a combined signal by utilizing said reference times and said predetermined relative times to combine said detection wave trains in the time relationship wherein the detection wave trains which would be produced from said received wave trains, if said received wave trains had not passed through the medium, would be substantially all in phase during the respective cycles corresponding to said selected cycles of said transmitted wave trains, and comparing the time of occurrence of said combined signal with the times of application to the medium of said selected cycles of said transmitted wave trains to determine the time of travel of said signal through the medium.

6. A method of determining the time of travel of a signal through a medium which method comprises applying a signal to the medium, said signal comprising a plurality of wave trains, each of said wave trains being transmitted for a limited time at a respective substantially constant frequency, a selected cycle of each transmitted wave train being applied to the medium at a respective predetermined time relative to a respective reference time for each wave train, receiving said wave trains after their passage through the medium, selectively tuning a narrow band pass active filter to the respective frequencies of said transmitted wave trains, selectively adjusting the Q of said filter to be directly proportional to the frequency to which said filter is tuned, applying said received wave trains to said filter to produce a separate detection wave train corresponding to each of said transmitted wave trains, producing a combined signal by utilizing said reference times and said predetermined relative times to combine said detection wave trains in the time relationship wherein the detection wave trains which would be produced from said received wave trains, if said received wave trains had not passed through the medium, would be substantially all in phase during the respective cycles corresponding to said selected cycles of said transmitted wave trains, and comparing the time of occurrence of said combined signal with the times of application to the medium of said selected cycles of said transmitted wave trains to determine the time of travel of said signal through the medium.

7. Apparatus for determining the time of travel of a signal through a medium comprising transmitting means for applying a plurality of wave trains to the medium, each of said wave trains having a limited duration and a respective substantially constant frequency, timing means for regulating the time of application of a selected cycle of each transmitted wave train to the medium so that said cycle occurs at a respective predetermined time relative to a respective reference time for each wave train, receiving means for receiving said wave trains after their passage through the medium, a narrow band pass active filter for selecting from said received wave trains only the component at a selected one of the frequencies of said transmitted wave trains to produce a separate detection wave train corresponding to each of said transmitted wave trains, combining means operatively connected to said timing means and said filter for utilizing said reference times and said predetermined relative times to combine said detection wave trains in the time relationship wherein the detection wave trains which would be produced from said received wave trains, if said received wave trains had not passed through the medium, would be substantially all in phase during the respective cycles corresponding to said selected cycles of said transmitted wave trains to produce a combined signal, and means operatively connected with said timing means and said combining means for comparing the time of occurrence of said combined signal with the times of application of said selected cycles of said transmitted wave trains to determine the time of travel of said signal through the medium.

8. Apparatus for determining the time of travel of a signal through the earth comprising transmitting means for applying a plurality of seismic wave trains to the earth, each of said wave trains having a limited duration and a respective substantially constant frequency, timing means for regulating the time of application of a selected cycle of each transmitted wave train to the earth so that said cycle occurs at a respective predetermined time relative to a respective reference time for each wave train, receiving means for receiving said wave trains after their passage through the earth, a narrow band pass active filter for selecting from said received wave trains only the component at a selected one of the frequencies of said transmitted wave trains to produce a separate detection wave train corresponding to each of said transmitted wave trains, combining means operatively connected to said timing means and said filter for utilizing said reference times and said predetermined relative times to combine said detection wave trains in the time relationship wherein the detection wave trains which would be produced from said received wave trains, if said received wave trains had not passed through the earth, would be substantially all in phase during the respective cycles corresponding to said selected cycles of said transmitted wave trains to produce a combined signal, and means selectively connected to said timing means and said combining means for comparing the time of occurrence of said combined signal with the times of application of said selected cycles of said transmitted wave trains to determine the time of travel of said signal through the earth.

9. Apparatus for determining the time of travel of a signal through a medium comprising transmitting means for applying a plurality of wave trains to the medium, each of said wave trains having a limited duration and a respective substantially constant frequency, timing means for regulating the time of application of a selected cycle of each transmitted wave train to the medium so that said cycle occurs at a respective predetermined time relative to a respective reference time for each wave train, receiving means for receiving said wave trains after their passage through the medium, a narrow band pass active filter for selecting from the received wave trains only the component at a selected one of the frequencies of said transmitted wave trains to produce a separate detection wave train corresponding to each of said transmitted wave trains, combining means selectively connected to said timing means and said filter for utilizing said reference times and said predetermined relative times to combine said detection wave trains in a predetermined time relationship to produce a combined signal, and means operatively connected to said timing means and said combining means for comparing the time of occurrence of said combined signal with the times of application of said selected cycles of said transmitted wave trains to determine the time of travel of said signal through the medium.

10. Apparatus for determining the time of travel of a signal through a medium comprising transmitting means for applying a plurality of wave trains to the medium, each of said wave trains having a limited duration and a respective substantially constant frequency, timing means for regulating the time of application of a selected cycle of each transmitted wave train to the medium so that said cycle occurs at a respective predetermined time relative to a respective reference time for each wave train, receiving means for receiving said wave trains after their passage through the medium, a narrow band pass active filter including frequency control means for selectively tuning said filter to the respective frequencies of said transmitted waves and Q control means for selectively adjusting the Q of said filter, means for applying said received wave trains to said filter to produce a detection wave train corresponding to each of said transmitted wave trains, means operatively connected to said timing means and said filter for combining said detection wave trains in a predetermined time relationship utilizing said reference times and said predetermined relative times to produce a combined signal, means operatively connected to said timing means and said combining means for comparing the time of occurrence of said combined signal with the times of application of said selected cycles of said transmitted wave trains to determine the time of travel of said signal through the medium.

11. Apparatus for determining the time of travel of a signal through a medium comprising transmitting means for applying a plurality of wave trains to the medium, each of said wave trains having a limited duration and a respective substantially constant frequency, timing means for regulating the time of application of a selected cycle of each transmitted wave train to the medium so that said cycle occurs at a respective predetermined time relative to a respective reference time for each wave train, receiving means for receiving said wave trains after their passage through the medium, a narrow band pass active filter including frequency control means for selectively tuning said filter to the respective frequencies of said transmitted waves and Q control means for selectively adjusting the Q of said filter so that filter response approximates the correlation function of the respective transmitted wave trains, means for applying said received wave trains to said filter to produce a detection wave train corresponding to each of said transmitted wave trains, means operatively connected to said timing means and said filter for combining said detection wave trains in a predetermined time relationship utilizing the reference times and said predetermined times to produce a combined signal, means operatively connected to said timing means and said combining means for comparing the time of occurrence of said combined signal with the times of application of said selected cycles of said transmitted wave trains to determine the time of travel of said signal through the medium.

12. Apparatus for determining the time of travel of a signal through a medium comprising transmitting means for applying a plurality of wave trains to the medium, each of said wave trains having a limited duration and a respective substantially constant frequency, timing means for regulating the time of application of a selected cycle of each transmitted wave train to the medium so that said cycle occurs at a respective predetermined time relative to a respective reference time for each wave train, receiving means for receiving said wave trains after their passage through the medium, a narrow band pass active filter including frequency control means for selectively tuning said filter to the respective frequencies of said transmitted waves and Q control means for selectively adjusting the Q of said filter so that the filter output in response to each of said transmitted waves rises substantially to its steady state over a time equal to the duration of said transmitted wave train and falls to about one fourth its maximum amplitude over a time equal to the duration of said transmitted wave train, means for applying said received wave trains to said filter to produce a detection wave train corresponding to each of said transmitted wave trains, means operatively connected to said timing means and said filter for combining said detection wave trains in a predetermined time relationship utilizing said reference times and said predetermined times to produce a combined signal, means operatively connected to said timing means and said combining means for comparing the time of occurrence of said combined signal with the times of application of said selected cycles of said transmitted wave trains to determine the time of travel of said signal through the medium.

13. Apparatus for determining the time of travel of a signal through a medium comprising transmitting means for applying a plurality of wave trains to the medium, each of said wave trains having a limited duration and a respective substantially constant frequency, timing means for regulating the time of application of a selected cycle of each transmitted wave train to the medium so that said cycle occurs at a respective predetermined time relative to a respective reference time for each wave train, receiving means for receiving said wave trains after their passage through the medium, a narrow band pass active filter including frequency control means for selectively tuning said filter to the respective frequencies of said transmitted waves and Q control means for selectively adjusting the Q of said filter, said Q control means being operably connected to said frequency control means so that the Q of said filter is directly proportional to the frequency to which said filter is tuned, means for applying said received wave trains to said filter to produce a detection wave train corresponding to each of said transmitted wave trains, means operatively connected to said timing means and said filter for combining said detection wave trains in a predetermined time relationship utilizing said predetermined times and said reference times to produce a combined signal, and means operatively connected to said timing means and said combining means for comparing the time of occurrence of said combined signal with the times of application of said selected cycles of said transmitted wave trains to determine the time of travel of said signal through the medium.

References Cited

UNITED STATES PATENTS

| | | | |
|---|---|---|---|
| 2,167,124 | 7/1939 | Minton | 181—0.5 |
| 2,558,868 | 7/1951 | McCarthy | 181—0.5 |
| 2,745,507 | 5/1956 | Bodine | 340—15.5 X |
| 2,979,692 | 4/1961 | Grannemann et al. | 181—0.5 X |
| 3,015,086 | 12/1961 | Heintz. | |
| 3,182,743 | 5/1965 | McCollum | 181—0.5 |
| 3,284,769 | 11/1966 | Skelton | 181—0.5 X |

OTHER REFERENCES

"Active Filter Element and Its Application to a Fourier Comb," by F. T. May and R. A. Dandl, The Review of Scientific Instruments, vol. 32, No. 4, April 1961, pp. 387—391.

RODNEY D. BENNETT, *Primary Examiner.*

SAMUEL FEINBERG, BENJAMIN A. BORCHELT, *Examiners.*

M. F. HUBLER, *Assistant Examiner.*

UNITED STATES PATENT OFFICE
CERTIFICATE OF CORRECTION

Patent No. 3,363,229                            January 9, 1968

Park H. Miller, Jr., et al.

It is hereby certified that error appears in the above numbered patent requiring correction and that the said Letters Patent should read as corrected below.

Column 7, line 69, for "arragnement" read -- arrangement --; column 9, line 21, for "fom" read -- from --; line 74, for $\omega^2 \chi F(t)$                      read                    $\omega^2 F(t)$ column 10, line 61, after the equation insert a semi-colon; column 16, line 6, for "on" read -- or --.

Signed and sealed this 15th day of April 1969.

(SEAL)
Attest:

Edward M. Fletcher, Jr.
Attesting Officer

EDWARD J. BRENNER
Commissioner of Patents